(12) United States Patent
Battlogg

(10) Patent No.: US 12,188,532 B2
(45) Date of Patent: Jan. 7, 2025

(54) DEVICE COMPONENT FOR A MAGNETORHEOLOGICAL BRAKING APPARATUS, HAVING TEMPERATURE COMPENSATION

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 317 days.

(21) Appl. No.: 17/787,648

(22) PCT Filed: Dec. 18, 2020

(86) PCT No.: PCT/EP2020/087100
§ 371 (c)(1),
(2) Date: Jun. 21, 2022

(87) PCT Pub. No.: WO2021/123223
PCT Pub. Date: Jun. 24, 2021

(65) Prior Publication Data
US 2022/0412416 A1  Dec. 29, 2022

(30) Foreign Application Priority Data

Dec. 18, 2019 (DE) ...................... 10 2019 135 027.1

(51) Int. Cl.
*F16D 57/00* (2006.01)
*F16D 121/20* (2012.01)
*G06F 3/01* (2006.01)

(52) U.S. Cl.
CPC ........ *F16D 57/002* (2013.01); *F16D 2121/20* (2013.01); *G06F 3/016* (2013.01)

(58) Field of Classification Search
CPC .... F16D 57/002; F16D 2121/20; F16F 9/532; F16F 9/535; G06F 3/016
(Continued)

(56) References Cited

U.S. PATENT DOCUMENTS

| 4,350,913 A | * | 9/1982 | Eddens | .................. F16D 57/002 |
| | | | | 192/21.5 |
| 5,492,312 A | * | 2/1996 | Carlson | .................... B66B 7/044 |
| | | | | 188/267.2 |

(Continued)

FOREIGN PATENT DOCUMENTS

| DE | 202014002171 U1 | 6/2015 |
| DE | 102016118920 A1 | 10/2017 |

(Continued)

*Primary Examiner* — Bradley T King
(74) *Attorney, Agent, or Firm* — Laurence A. Greenberg; Werner H. Stemer; Ralph E. Locher

(57) ABSTRACT

A device component has a magnetorheological braking apparatus with a stationary holder and at least two brake components. One of the two brake components is connected to the holder for conjoint rotation and extends in the axial direction. The two brake components can be rotated relative to each other. The second brake component has a hollow sleeve part and surrounds the first brake component. A closed chamber is formed between the brake components. The second brake component is rotatably accommodated on the first brake component at a first end of the closed chamber. The closed chamber is substantially filled with a magnetorheological medium. A magnetic-field generator forms a magnetic field to influence the medium in the closed chamber. The second brake component is axially slidable on the first brake component to change a volume of the closed chamber to compensate for temperature-related and/or leakage-related volume changes.

32 Claims, 6 Drawing Sheets

(58) Field of Classification Search
USPC .......................................... 188/267.1–267.2
See application file for complete search history.

(56) References Cited

U.S. PATENT DOCUMENTS

| | | | | |
|---|---|---|---|---|
| 7,588,131 B2* | 9/2009 | Steinwender | ........... | F16D 37/02 |
| | | | | 192/58.41 |
| 10,857,969 B2 | 12/2020 | Battlogg | | |
| 11,300,990 B2 | 4/2022 | Battlogg | | |
| 11,725,709 B2* | 8/2023 | Battlogg | ................. | F16F 9/535 |
| | | | | 188/267.2 |
| 2009/0133976 A1* | 5/2009 | Bose | ....................... | F16F 9/535 |
| | | | | 252/62.51 R |
| 2012/0291732 A1* | 11/2012 | Oe | ......................... | B60T 10/00 |
| | | | | 188/267.2 |
| 2013/0019827 A1* | 1/2013 | Oka | ........................ | F16J 15/43 |
| | | | | 188/267.2 |
| 2018/0156285 A1* | 6/2018 | Plante | ..................... | F16D 37/02 |
| 2018/0252289 A1 | 9/2018 | Haba et al. | | |
| 2020/0355229 A1 | 11/2020 | Battlogg | | |
| 2021/0207680 A1* | 7/2021 | Kuge | ...................... | F16D 37/02 |
| 2021/0215227 A1* | 7/2021 | Lun | ........................... | F16F 9/12 |
| 2021/0251781 A1 | 8/2021 | Battlogg | | |
| 2021/0278872 A1* | 9/2021 | Battlogg | .................. | G05G 5/03 |
| 2023/0031876 A1* | 2/2023 | Battlogg | .................. | G05G 25/00 |
| 2023/0036212 A1* | 2/2023 | Battlogg | .................. | G01B 7/30 |
| 2023/0087434 A1* | 3/2023 | Battlogg | ............... | G06F 3/0362 |
| | | | | 345/163 |
| 2023/0102886 A1* | 3/2023 | Battlogg | .................. | G05G 5/03 |
| | | | | 188/267.2 |
| 2023/0236680 A1* | 7/2023 | Battlogg | .................. | G06F 3/016 |
| | | | | 345/156 |
| 2023/0241973 A1* | 8/2023 | Battlogg | .................. | G05G 5/03 |
| | | | | 188/267.2 |
| 2023/0375052 A1* | 11/2023 | Battlogg | .................. | G05G 5/03 |
| 2023/0384815 A1* | 11/2023 | Battlogg | ................ | B62D 5/006 |
| 2024/0229874 A1* | 7/2024 | Battlogg | .................. | G06F 3/016 |

FOREIGN PATENT DOCUMENTS

| | | |
|---|---|---|
| DE | 102018100390 A1 | 7/2019 |
| WO | 2017064316 A1 | 4/2017 |
| WO | 2018154117 A1 | 8/2018 |

* cited by examiner

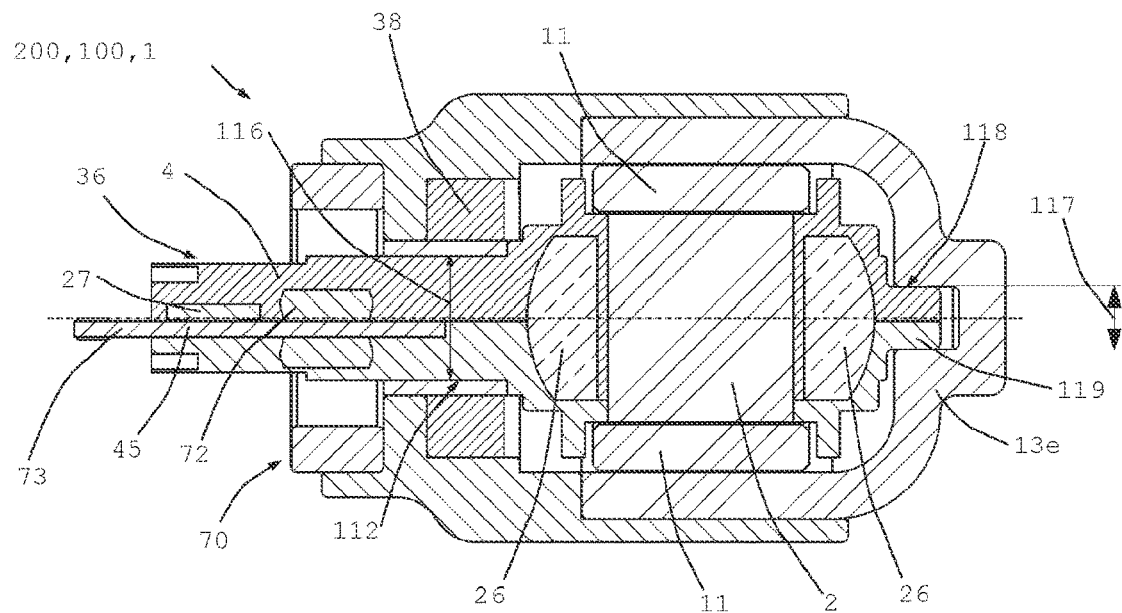
Fig. 6a
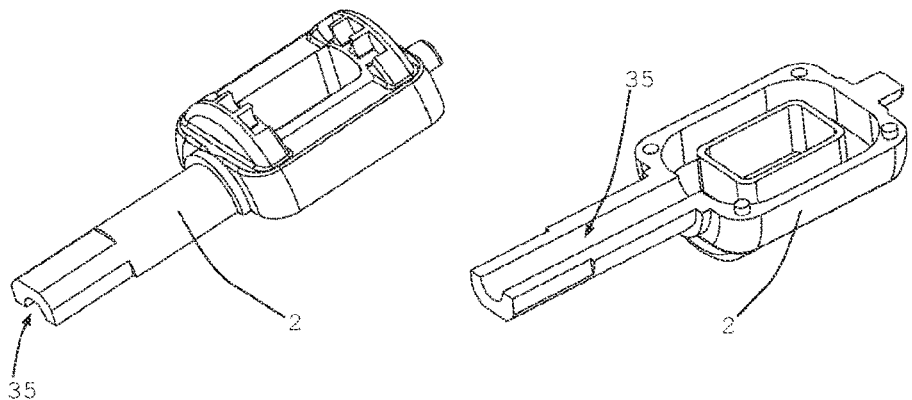
Fig. 6b
Fig. 6c
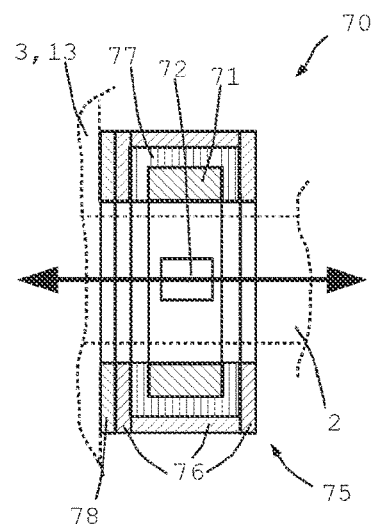
Fig. 6d

DEVICE COMPONENT FOR A MAGNETORHEOLOGICAL BRAKING APPARATUS, HAVING TEMPERATURE COMPENSATION

FIELD AND BACKGROUND OF THE INVENTION

The invention relates to a device component having a magnetorheological braking apparatus, comprising a stationary holder and comprising at least two brake components. One of the two brake components is connected in a rotationally fixed manner to the holder and extends in the axial direction. The two brake components can be continuously rotated relative to one other. The second brake component has a hollow sleeve part and surrounds the first brake component. A closed chamber is formed between the brake components, wherein the second brake component is held on the first brake component at a first end of the closed chamber. The closed chamber is substantially filled with a magnetorheological medium. At least one magnetic field-generating apparatus for generating at least one magnetic field is provided in order to influence the magnetorheological medium in the closed chamber.

The device component according to the invention having a magnetorheological braking apparatus can be used for braking mutual relative movements, in particular including a mutual rotational movement, in a variety of technical fields. The magnetorheological braking apparatus according to the invention can also be used as a haptic operator control apparatus and, for example, for operating technical apparatuses in vehicles, aerospace and aircraft systems, ships, boats, agricultural machinery (tractors, combine harvesters, harvesters, other agricultural machinery), construction machinery and material handling machinery (forklift trucks . . . ) or in medical or industrial systems. The invention can also be used for operating, or as an input device for, washing machines, kitchen/domestic appliances and apparatuses, radios, still and movie cameras, HiFi and TV systems, smart devices, smart domestic devices, laptops, personal computers, smart watches, in a crown gear of wristwatches or as a scroll wheel in a computer mouse or other devices.

Magnetorheological fluids have minute ferromagnetic particles such as, for example, carbonyl iron powder, distributed in an oil, for example. Spherical particles having a production-related diameter of from 1 to 10 µm are used in magnetorheological liquids, wherein the particle size and shape are not uniform. When such a magnetorheological fluid is acted on by a magnetic field, the carbonyl iron particles of the magnetorheological fluid interlink along the magnetic field lines, so that the rheological properties of the magnetorheological fluid (MRF) are significantly influenced as a function of the shape and strength of the magnetic field.

A closed chamber within the magnetorheological braking apparatus is generally filled with the magnetorheological medium. The magnetorheological braking apparatus is generally operated at temperatures of between −40° C. and +80° C. In the event of a change in the ambient or operating temperature, the volume of the magnetorheological medium in the closed chamber also changes. High pressure forces can be produced on the components and above all on the seals. The magnetorheological braking apparatus has to be sealed off from the surrounding area, so that the magnetorheological medium cannot escape and also no liquids or air can enter the closed chamber from the outside. Both situations lead to a reduction in performance, that is to say the maximum force which can be transmitted and the function of force transmission are impaired. Therefore, temperature-related changes in volume have to be compensated for.

In practice, when filling the closed chamber with a magnetorheological medium, a remaining volume can be filled with a gas. The gas is compressed in the event of a temperature-related change in volume of the magnetorheological medium. An increase in pressure is reduced by the gas buffer, so that leakages can be prevented, in particular.

However, a particular disadvantage is that the forces which can be transmitted and the basic function can be impaired by the gas. Furthermore, above all the service life of the seals is impaired by the increased pressure. In addition, there is an increased level of friction.

In addition, a compensation vessel can be provided, which, in the event of a change in volume of the magnetorheological medium, operates as a buffer and can hold a portion of the magnetorheological medium and can also dispense it again. In the event of a leakage, the loss of magnetorheological medium is compensated for again by the compensation vessel. For this purpose, the compensation vessel is connected to the closed chamber via valves. The increase in pressure in the closed chamber is reduced. The compensation vessel has to be open to the surrounding area (or coupled to a diaphragm to the ambient pressure) or have a compressible gas buffer itself.

However, a particular disadvantage here is accommodating the compensation vessel on or in the magnetorheological braking apparatus with small dimensions. In addition, the complicated mechanism for connection of the compensation vessel is susceptible to faults and is expensive. In addition, an increase in pressure caused by a temperature-related change in volume can only be reduced, but not prevented. The valves may have to be serviced.

SUMMARY OF THE INVENTION

Therefore, the object of the present invention is to provide a device component having a magnetorheological braking apparatus, which allows simple and cost-effective temperature compensation within the magnetorheological braking apparatus of the device component.

This object is achieved by a device component having a magnetorheological braking apparatus as claimed. Preferred developments of the invention are the subject matter of the dependent claims. Further advantages and features of the invention can be found in the general description and the description of the exemplary embodiments.

A device component according to the invention comprises a magnetorheological braking apparatus comprising a stationary holder and at least two brake components. One of the two brake components is connected in a rotationally fixed manner to the holder and extends in the axial direction. The two brake components can be (continuously) rotated, preferably at least pivoted, relative to one other. The second brake component has a hollow sleeve part which surrounds the first brake component. A closed chamber (which is sealed off from the outside) is formed between the brake components. The second brake component is held, and in particular mounted, in a rotatable manner on the first brake component (at a first bearing point) at a first end of the closed chamber. The closed chamber is substantially (substantially completely or completely) filled with a magnetorheological medium. At least one magnetic field-generating apparatus for generating at least one magnetic field is provided in order to influence the magnetorheological medium in the closed chamber.

According to the invention, the second brake component is held or mounted in an axially displaceable manner on the first brake component. A volume of the closed chamber is changed by a relative axial displacement of the brake components. Changes in volume and preferably temperature-related changes in volume are compensated for in this way.

The magnetorheological braking apparatus according to the invention has many advantages. A considerable advantage of the magnetorheological braking apparatus according to the invention is that the temperature compensation can be implemented in a cost-effective and simple manner. The volume of the closed chamber advantageously changes owing to the relative displacement of the first brake component with respect to the second brake component, so that only a small number of moving components is present. The magnetorheological braking apparatus with temperature compensation according to the invention is low maintenance and has a long service life. No compensation vessel or any other additional mechanical apparatus is required. The temperature compensation according to the invention is advantageously suitable for compensating for changes in volume of the magnetorheological medium which can be caused, in particular, by changes in temperature and/or however also by leakages. In addition, there is advantageously no remaining volume filled with gas located within the main component of the magnetorheological braking apparatus. Owing to the relative axial displacement of the first and the second braking component with respect to one another, the system always operates at ambient pressure, so that the seals are not subject to additional loading.

The second brake component is preferably held, and in particular mounted, in a displaceable manner on the first brake component at a second end of the chamber. A diameter of the first bearing point at the first end of the closed chamber is expediently different from a diameter of the second bearing point at the second end of the closed chamber.

A direction of the relative axial displacement of the brake components with respect to one another can advantageously be controlled as a function of the diameter in this way. The bearing points preferably have a cylindrical sealing surface. The sealing surface can advantageously be manufactured in a cost-effective manner. A sliding ring seal is particularly preferably used for radial bearing together with axially displaceable guidance.

In an advantageous development, the second diameter at the second bearing point is smaller than the first diameter at the first bearing point, so that the volume of the closed chamber is increased by an axial displacement in the direction of the first bearing point and reduced in the opposite direction. Accordingly, the volume of the closed chamber is advantageously increased when the first braking component is pushed at least partly out of the surrounding first braking component. This development is particularly advantageously suitable when the magnetorheological braking apparatus is intended to be displaced preferably toward the first bearing point in the event of an, in particular temperature-related, change in volume.

A ratio of the diameter of the first bearing point to the diameter of the second bearing point particularly advantageously has a value of between 1.1 and 4. In particular, this ratio has a value of between 1.5 and 3, and particularly preferably a value of approximately 3 or in particular 2. Therefore, a relative axial displacement, which results from a temperature-related change in volume of the magnetorheological medium, can preferably be controlled by this ratio.

The diameter of the second bearing point is advantageously larger than the diameter of the first bearing point, so that the volume of the closed chamber is increased by an axial displacement in the direction of the second bearing point.

The direction of the axial displacement can advantageously be controlled or specified in this way. In this case, the diameters can be dimensioned with respect to one another such that a non-critical movement direction is favored, for example in a tolerance-dependent manner.

In an advantageous development, a ratio of the diameter of the first bearing point to the diameter of the second bearing point has a value of between 0.25 and 0.9. In particular, this ratio can also have a value of between 0.3 and 0.75, and particularly preferably also a value of 0.5. A small ratio with a small change in level advantageously results in the case of the known or specified temperature-related change in volume.

In an advantageous further development, the second brake component surrounds an end portion of the first brake component in a pot-like manner. The second bearing point is expediently designed as an axle stub, in particular with a free end. The configuration is particularly suitable when the second brake component is intended to be used as a rotary knob, an operator control knob or else an operator control apparatus, for example in multimedia devices.

At least one compensation duct is preferably present within the first brake component and connects the regions close to the bearing points to one another. Therefore, the throttle effect by means of the gap in the case of an axial displacement is advantageously reduced. A plurality of compensation ducts are also particularly advantageously possible.

A relative axial displacement of the first brake component with respect to the second brake component of at least approximately 0.05 mm is advantageously possible. The relative axial displacement of the first brake component with respect to the second brake component is preferably at least approximately 0.25 mm and in particular at least 0.5 mm. Furthermore, greater displacements are also possible.

A relative axial displacement of the first brake component with respect to the second brake component of at most around 2 mm is expediently possible. The maximum relative axial displacement is advantageously approximately 1.5 mm and in particular at least 1 mm.

In a preferred development, the closed chamber has at least one encircling gap which is formed between the brake components. The magnetic field of the magnetic field-generating apparatus is preferably generated within the gap in order to influence the magnetorheological medium within the gap. Very accurate control and operability of the magnetorheological braking apparatus is advantageously possible in this way.

At least one, two or more rotatable transmission elements are preferably arranged in the gap. The transmission elements are preferably designed as roller bodies and have a cylindrical or spherical or round or rounded cross section.

In an advantageous development, at least some of the transmission elements are composed of a magnetically permeable material. At least some of the rotary bodies are composed of a magnetically non-permeable material.

The first brake component preferably comprises a core which extends in the axial direction and is composed of a magnetically permeable material.

The sleeve part and/or the second brake component are/is advantageously composed of a magnetically permeable material. The sleeve part and/or the second brake component preferably provide/provides an outer ring for the magnetic field.

In an advantageous development, the first brake component is of substantially cylindrical design. The first brake component comprises, in particular, a cylindrical main body as the core, which comprises the electrical coil of the magnetic field-generating apparatus.

In a preferred configuration, the holder has at least one cable bushing.

The holder advantageously has at least one receptacle for connection in a rotationally fixed manner to the first brake component. The first brake component advantageously has a cylindrical running surface. The second brake component is preferably held in a rotatable manner. In particular, a seal for sealing off the closed chamber is arranged on the cylindrical running surface.

In an advantageous development, the magnetic field-generating apparatus comprises at least one electrical coil.

The electrical coil is preferably wound in the radial direction, so that the magnetic field extends in the axial direction of the first brake component.

In a further advantageous development, the electrical coil is wound in the axial direction. The electrical coil advantageously defines a coil plane, so that a magnetic field of the electrical coil extends transversely to the axial direction through the first brake component.

A maximum outer diameter of the electrical coil in a radial direction within the coil plane is advantageously larger than a minimum outer diameter of the core in a radial direction transverse, in particular perpendicular, to the coil plane.

At least one sensor apparatus is advantageously included. The sensor apparatus advantageously comprises at least one magnetic ring unit and at least one magnetic field sensor, connected in a rotationally fixed manner to the first brake component and arranged radially and/or axially adjacent to the magnetic ring unit, for detecting a magnetic field of the magnetic ring unit. The sensor apparatus is designed, in particular, as a multidimensional Hall sensor.

The magnetic ring unit is advantageously fastened at least to the rotary part.

In a further advantageous development, the device component comprises at least one shielding apparatus. The shielding apparatus is suitable for at least partially shielding the sensor apparatus from a magnetic field of the electrical coil.

The shielding apparatus advantageously comprises at least one shielding body which surrounds the magnetic ring unit at least in sections. The shielding apparatus also comprises, in particular, at least one separating unit which is arranged between the shielding body and the magnetic ring unit. Furthermore, the shielding unit can comprise at least one magnetic decoupling device which is arranged between the shielding body and the rotary part.

The separating unit preferably has a magnetic permeability which is several times lower than the shielding body. In particular, the decoupling apparatus has a magnetic permeability which is several times lower than the shielding body.

In another development, the shielding apparatus can comprise at least one axial annular disk and at least one annular sleeve.

The shielding apparatus and the magnetic ring unit are advantageously arranged at a distance from one another. In particular, an injection-molded part can be located therebetween.

In a preferred development, the device component can comprise a user interface, an operator control panel, a display, a touch-sensitive display with or without haptic feedback and/or at least one sensor or one sensor unit.

In another development, at least one component through which the magnetic field flows is at least partially composed of the material FeSi3P.

Further advantages and features of the present invention can be found in the exemplary embodiments which are explained below with reference to the appended figures.

BRIEF DESCRIPTION OF THE FIGURES

FIGS. 6a-6d show another device component according to the invention having a magnetorheological braking apparatus;

DETAILED DESCRIPTION OF THE INVENTION

FIGS. 1a to 1f show a plurality of device components 200 according to the invention, in which the magnetorheological braking apparatus 1 can be used. The device components 200 are each embodied as a haptic operator control device 100.

Figure 1A:
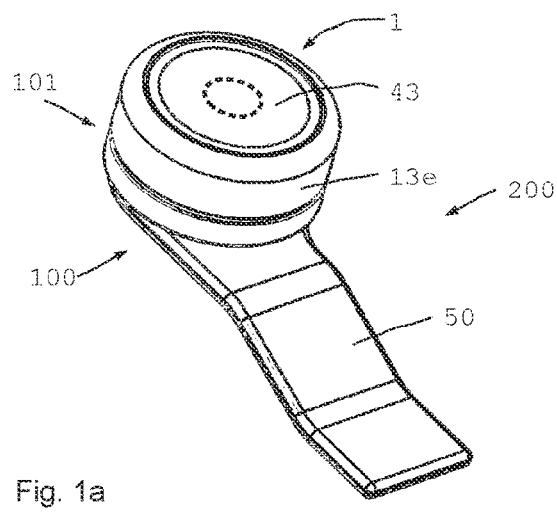
FIGS. 1a-1f show diagrammatic three-dimensional views of device components according to the invention having a magnetorheological braking apparatus.

FIG. 1a shows a haptic operator control knob 101. The operator control knob is fastened by means of the bracket 50. The operator control knob 101 is operated by means of the sleeve part 13e. The user interface 43 can additionally be used to transmit information.

Figure 1B:
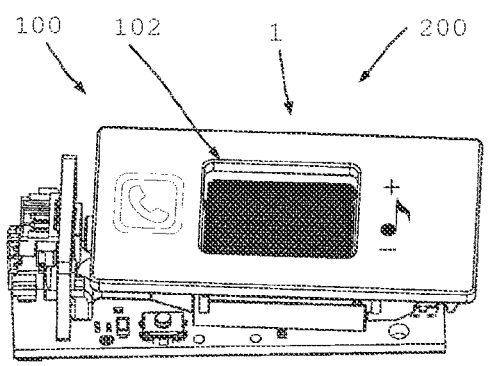

FIG. 1b shows the device component 200 as a thumb wheel 102 having a haptic operator control apparatus 100. The thumb wheel 102 can preferably be used in steering wheels, for example. However, the thumb wheel is not limited to this specific application. The thumb wheel 102 can generally also be employed using any other finger, depending on the installation situation.

Figure 1C:
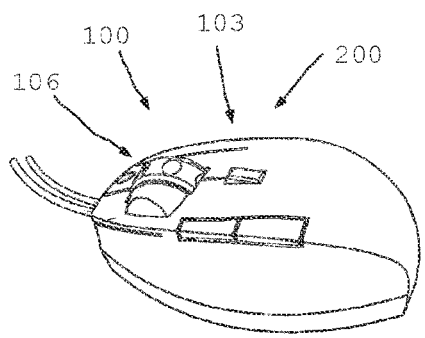
Figure 1D:
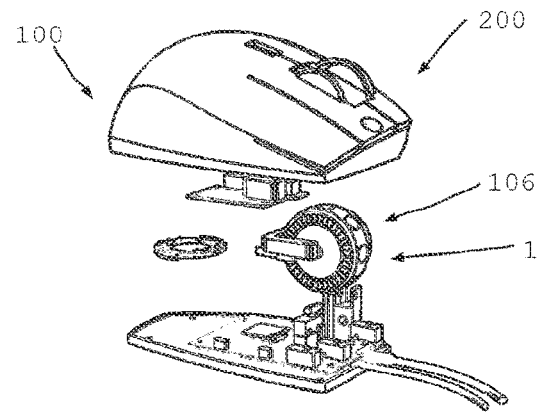
Figure 1E:
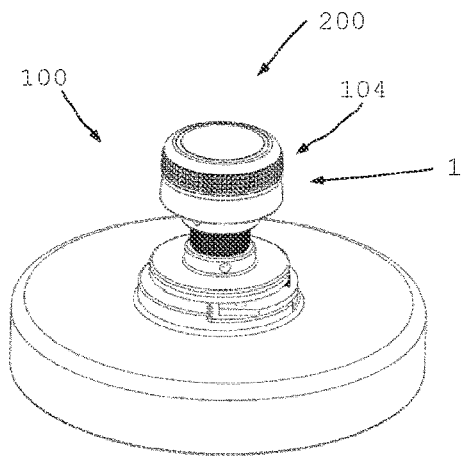
Figure 1F:
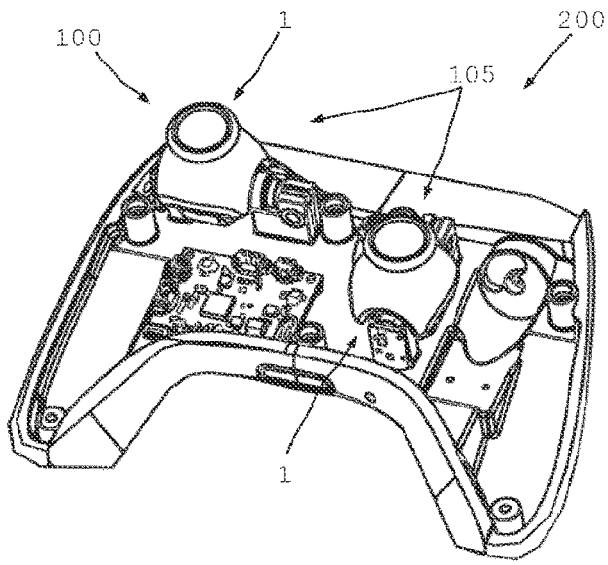

In FIG. 1c and FIG. 1d, the device component 200 according to the invention is embodied as a computer mouse 103. The haptic operator control apparatus 100 is arranged in the mouse wheel 106. The magnetorheological braking apparatus 1 can be used in order to control haptic feedback.

FIG. 1d shows a joystick 104 as a haptic operator control apparatus 100 in which a magnetorheological braking apparatus 1 is disposed. In addition, the magnetorheological braking apparatus 100 according to the invention can preferably also be used in a game pad 105 in order to provide haptic feedback to the player as a function of the game situation.

In these exemplary embodiments, the magnetorheological braking apparatus 1 has a rotary part 13 or sleeve part 13*e* which is held in a rotatable manner. The torque required for rotating the rotary part 13 is adjustable.

A user interface 43 can arranged on the top side of the magnetorheological braking apparatus 1. For example, such a user interface 43 can be designed as a display device or else as a touch-sensitive input option (touchpad, control by movement and gestures, image recognition . . . ).

A haptic operator control apparatus 100 can be used, for example, for operating machines, medical equipment, or for use in the and for the motor vehicle. Use on other devices or other apparatuses is also possible.

Figure 2:
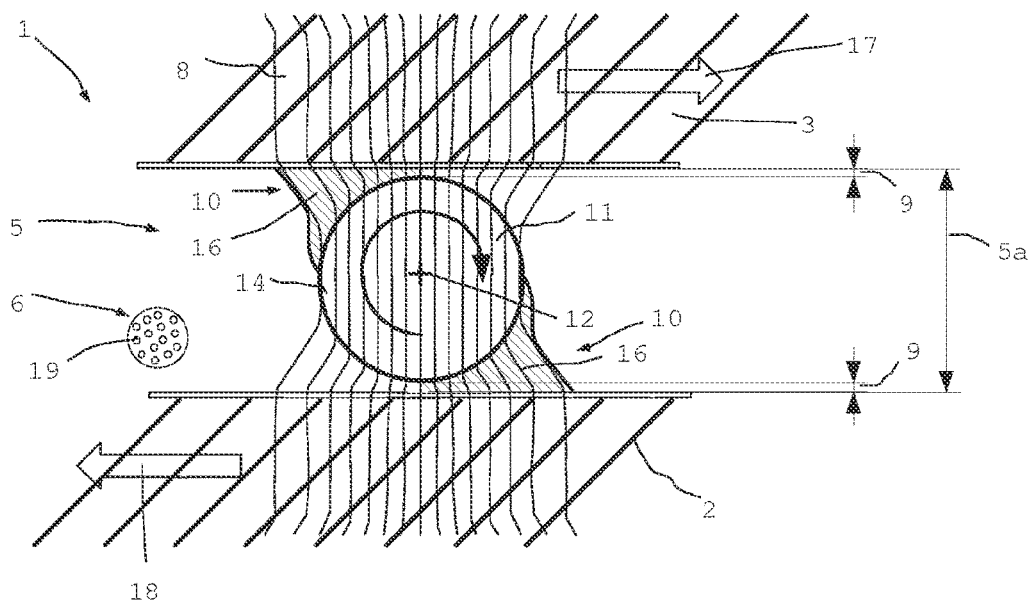
FIG. 2 shows a highly schematic cross section through a roller body of a magnetorheological braking apparatus.

FIG. 2 shows a highly schematic cross-sectional view through a magnetorheological braking apparatus 1 according to the invention for influencing the transmission of force between two brake components 2 and 3. In this case, a roller body or rotary body 11 is provided between the two brake components 2 and 3 in FIG. 2. The roller body 11 is designed as a ball 14 here. However, it is likewise possible for roller bodies 11 to be designed as cylinders or ellipsoids, rollers or other rotatable rotary bodies 11. Rotary bodies 11 which are not rotationally symmetrical in the true sense, such as a gear wheel or rotary body 11 having a specific surface structure, can also be used as roller bodies 11. The roller bodies 11 are not used for mounting the brake components 2, 3 relative to one another, but rather for the transmission of torque.

A duct 5, which is filled with a medium 6 here, is provided between the brake components 2 and 3. Here, the medium 6 is a magnetorheological fluid which as a carrier liquid comprises oil, for example, in which ferromagnetic particles 19 are present. Glycol, grease, water and viscous substances can also be used as the medium or carrier medium 6, the latter not being limited thereto. The medium or carrier medium 6 may also be gaseous, or the medium or carrier medium 6 may be dispensed with (vacuum). In this case, the duct 5 is filled only with particles 19 which can be influenced by the magnetic field 8.

The ferromagnetic particles 19 are preferably carbonyl iron powder, wherein the size distribution of the particles is a function of the particular application. Specifically, a distribution of the particle size of between one and ten micrometers is preferred, where however larger particles of twenty, thirty, forty and fifty micrometers are also possible. Depending on the specific application, the particle size may also be considerably larger and even venture into the millimeter range (particle spheres). The particles can also have a special coating/casing (titanium coating, ceramic casing, carbon casing, etc.) in order for said particles to better withstand the high compressive loads which may arise depending on the specific application. For this specific application, the magnetorheological particles 19 can not only be produced only from carbonyl iron powder (pure iron), but also from special iron (harder steel), for example.

The roller body 11 is preferably set in rotation about its rotation axis 12 by the relative movement 17, 18 of the two brake components 2 and 3 and practically rolls on the surface of the brake component 3. At the same time, the roller body 11 runs on the surface of the other brake component 2, so that a relative speed 18 prevails there.

More specifically, the roller body 11 is not in direct contact with the surface of the brake components 2 and/or 3 and, therefore, does not roll directly on the latter. The clear distance 9 from the roller body 11 to one of the surfaces of the brake components 2 or 3 is, for example, 140 μm. In a specific refinement with particle sizes of between 1 μm and 10 μm, the clear distance 9 is in particular between 75 μm and 300 μm, and particularly preferably between 100 μm and 200 μm.

The clear distance 9 is, in particular, at least ten times the diameter of a typical mean particle diameter. The clear distance 9 preferably amounts to at least ten times a maximum typical particle 19. Owing to the lack of direct contact, there is a very low base friction/base force/base moment in the relative movement of the brake components 2 and 3 with respect to one another.

If a magnetic field 8 is applied to the magnetorheological braking apparatus 1, the field lines are formed depending on the distance between the roller bodies 11 and the brake components 2, 3. The roller body 11 comprises a ferromagnetic material and, for example, in this case ST 37 (S235). Steel type ST 37 has a magnetic permeability μr of approximately 2000. The field lines (magnetic circuit) pass through the roller body 11 and are concentrated in the roller body 11. A high magnetic flux density prevails on the roller body 11 on the here radial inlet and outlet surfaces of the field lines in the duct 5. The inhomogeneous and strong magnetic field 8 in said duct leads to a local and strong linking of the magnetically polarizable particles 19 (magnetic interlinking). The effect is greatly increased owing to the rotational movement of the roller body 11 in the direction of the wedge 16 that forms in the magnetorheological fluid, and the possible braking or coupling moment is increased to the extreme far beyond the amount that can normally be generated in the magnetorheological fluid 6. The roller body 11 and brake components 2, 3 are preferably at least partially composed of ferromagnetic material, and for this reason the smaller the distance between the rotary body 11 and brake components 2, 3, the higher the magnetic flux density. As a result, a substantially wedge-shaped region 16 is formed in the medium, in which the gradient of the magnetic field increases sharply toward the acute angle at the contact point or the region of minimum distance.

Despite the distance between the roller bodies 11 and the brake components 2, 3, the roller body 11 can be set into rotational movement by the relative speed of the surfaces with respect to one another. The rotational movement is possible without and also with an active magnetic field 8.

If the magnetorheological braking apparatus 1 is exposed to a magnetic field 8 of an electrical coil 26, not illustrated in FIG. 2 here, the individual particles 19 of the magnetorheological fluid 6 are interlinked along the field lines of the magnetic field 8. It should be noted that the vectors that are marked in FIG. 2 only approximately diagrammatically represent the region of the field lines that is relevant for influencing the MRF. The field lines enter substantially normally to the surfaces of the ferromagnetic components into the duct 5 and in particular do not have to run in a straight line in the acute-angled region 10.

At the same time, some material is jointly set in rotation on the periphery of the roller body 11 by the magnetorheological fluid, so that an acute-angled region 10 is formed between the brake component 3 and the roller body 11. An identical acute-angled region 10 is formed on the other side between the roller body 11 and the brake component 2. The acute-angled regions 10 may have, for example, a wedge shape 16 in the case of roller bodies 11 that are of cylindrical configuration. The further rotation of the roller body 11 is prevented by way of the wedge shape 16, so that the effect of the magnetic field on the magnetorheological fluid 6 is amplified since the active magnetic field 8 within the acute-angled region 10 results in greater cohesion of the medium 6 there. This amplifies the effect of the magnetorheological fluid 6 in the accumulated cluster (the chain formation in the fluid and therefore the cohesion or the viscosity), this making further rotation or movement of the rotary body 11 more difficult.

The wedge shape 16 (particle accumulation) makes it possible to transmit significantly greater forces or moments than would be possible with a comparable construction that uses only the shearing movement without a wedge effect.

The forces that can be directly transmitted by the applied magnetic field 8 represent only a small portion of the forces which can be transmitted by the apparatus. The magnetic field 8 makes it possible to control the wedge formation and therefore the mechanical force amplification. The mechanical amplification of the magnetorheological effect can be such that it is possible to transmit a force, even after an applied magnetic field 8 has been switched off, if the particles 19 have been wedged.

It has been found that the wedge effect of the acute-angled regions 10 results in a considerably greater effect of a magnetic field 8 of a particular strength. In this case, the effect can be amplified multiple times. In one specific case, influencing of the relative speed of two brake components 2 and 3 with respect to one another that was approximately ten times stronger than in the prior art was observed in the case of MRF clutches based on the shear principle, in which a magnetorheological medium or fluid 6 is arranged between two surfaces moving with respect to one another and is exposed to the shear forces of the surfaces moving with respect to one another. The possible amplification here owing to the wedge effect depends on different factors. It can optionally be amplified even further by a greater surface roughness of the roller bodies 11. It is also possible for outwardly projecting protrusions to be provided on the outer surface of the roller bodies 11, which can lead to an even stronger wedge formation.

The wedge effect or the wedge action is distributed in areal fashion on the roller body 11 and the components 2 or 3.

Figure 3:
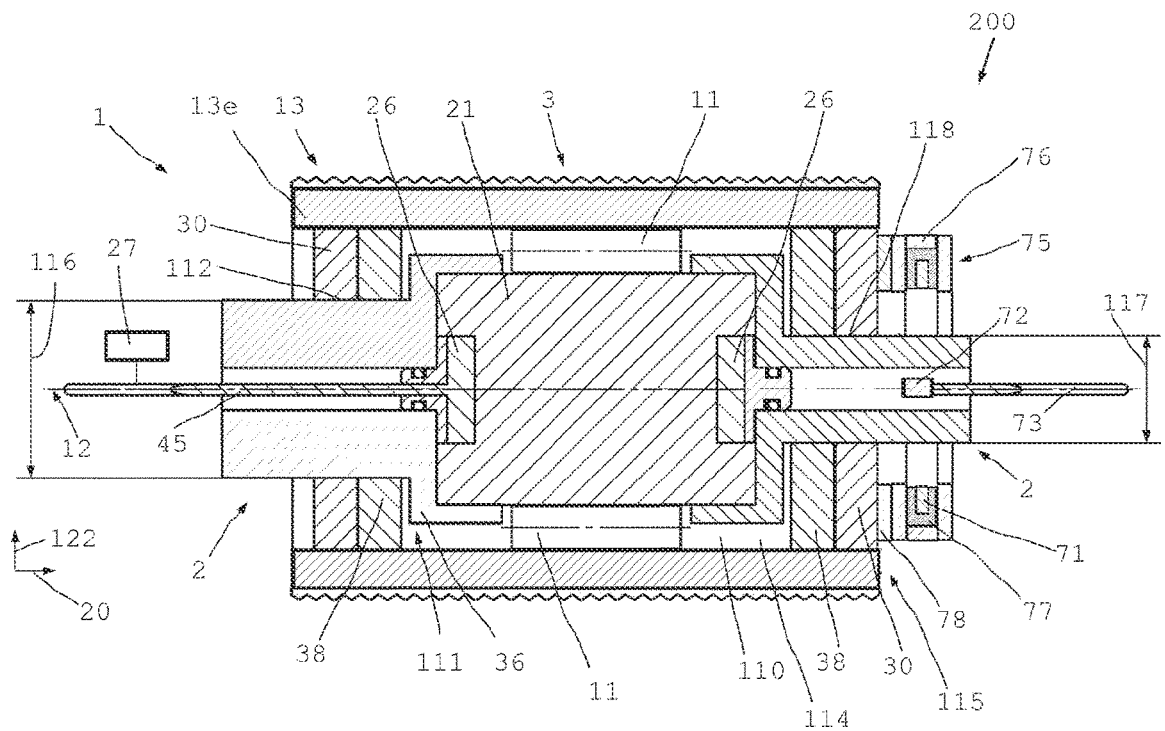
FIG. 3 shows a schematic cross section through a device component according to the invention, having a magnetorheological braking apparatus.

FIG. 3 shows a section through a device component 200 according to the invention having a magnetorheological braking apparatus 1 which has two brake components 2 and 3. The first brake component 2 and the second brake component 3 extend substantially in an axial direction 20. Here, the first brake component 2 is arranged in the interior of the second brake component 3 and is held by a holder 4 in a positively locking and/or non-positively locking manner. The holder 4 can be fastened, for example, to an external bracket or to a device. The holder 4 is typically fastened in a rotationally fixed manner. The second brake component 3 is held on the latter so as to be continuously rotatable with respect to the first brake component 2.

The second brake component 3 is elongate and has the rotary part 13 and therein a magnetically conductive sleeve part 13e.

The second brake component 3 is held in a rotatable manner at the first bearing point 112 and at the second bearing point 118 on the second brake component 2, and is in particular mounted in an axially displaceable manner. At the bearing points 112, 118, forces in a global radial direction 122 can be supported by the bearings 30, while the first brake component 2 is axially displaceable relative to the second brake component 3. Here, the diameter 116 of the first bearing point 112 is approximately double the diameter 117 of the second bearing point 118.

The second brake component 3 is guided out at both ends. A closed chamber 110, which is filled with MRF, is formed between the brake components 2 and 3. In the region of the first end 111 of the chamber 110, a cylindrical running surface on the holder 4 is designed as the first bearing point 112. A hardened surface or a surface of a corresponding quality is present there. A bearing 30 for rotatably mounting the second brake component 3 is attached to this cylindrical running surface 37. A seal 38 is provided adjacent to the bearing 30 further to the inside in the axial direction 20. The seal 38 reliably seals off the interior.

The first brake component 2 has a main body 33. The windings of an electrical coil 26 are wound around the core 21. In this case, the individual turns of the electrical coil 26 project outward beyond the cylindrical main body 33 (cf. FIG. 5).

A gap 5, which here is embodied substantially as a hollow-cylindrical gap 5, exists radially between the outer wall of the first brake component 2 and the inner wall of the sleeve part 13. A plurality of transmission components 11, which here are designed as roller bodies 11, are arranged in the gap. Here, the roller bodies 11 are designed as cylindrical roller bodies 11 and have an outside diameter which is somewhat smaller than the gap width 5a of the gap 5. Furthermore, the gap 5 here is filled with a magnetorheological medium 6.

An O-ring, or the like, which is filled with air or another gas and provides volumetric compensation in the event of fluctuations in temperature variations can be arranged in a region of the gap 5, for example. In addition, a reservoir is formed there as a result if magnetorheological fluid or medium 6 leak from the interior to the outside during the course of operation. Here, the construction is used, owing to the dissimilarly sized diameters 116, 117, to provide automatic temperature compensation and a reservoir for MRF.

Here, the (useable) gap length of the gap 5 is greater than the length of the roller bodies 11. Here, the electrical coil 26 is longer in the axial direction 20 than the length of the roller bodies 11.

The core 21 can be seen in the interior of the electrical coil 26. The holder 4 has a radially enlarged receptacle 36 (diameter 36a, cf. FIG. 4) for holding the first brake component 2 in a rotationally fixed manner. A cable bushing 35 extends through the holder 4 downward through the holder 4. Cables 45 for connecting the electrical coil 26 and optionally sensor lines are guided out there. A control device 27 can be provided or assigned in the foot of the holder 4, or at other suitable points in order to perform appropriate control.

A closed chamber 110 is formed between the first end 111 and the second end 115. The closed chamber 110 comprises the volume 114 which is filled substantially completely with the magnetorheological medium 6.

Here, a change in the volume of the magnetorheological medium 6 leads to a relative axial displacement of the first brake component 2 with respect to the second brake component 3 on account of different diameters 116, 117 of the two bearing points 112, 118.

If the first brake component 2 is stationary, the second brake component 3 is displaced to the right in the orientation of FIG. 3 in the event of an increase in volume. A small portion of the first brake component 2 with the diameter 116 at the first bearing point 112 exits from the closed chamber 110, while a portion of the first brake component 2 at the second end 115 with the considerably smaller diameter enters the closed chamber 110. In this way, the volume 114 of the closed chamber 110 is ultimately increased. A change in volume of the magnetorheological medium 6, caused by an increase in temperature, can therefore be compensated for, in particular. A function of the magnetic field-generating apparatus 113 is not influenced in the process. In the event of a decrease in volume, which may be temperature-related or else due to leakage, the second brake component 3 is displaced to the left here.

Ambient pressure practically always prevails within the magnetorheological braking apparatus 1 during the displacement. Above all, any additional loading of the seals 38 is prevented in this way. In the case of a compensation device based on a gas bubble, however, the interior space is always pressurized, this resulting in greater leakage and high friction as a result of the improved seal 38 required.

A compensation duct 120 which connects the regions close to the bearing points 112, 118 to one another can be provided. Therefore, the throttle effect of the gap 5 in the case of an axial displacement of the magnetorheological medium 6 is reduced, provided that said gap is intended to be very small.

Furthermore, the magnetorheological braking apparatus 1 has a sensor device 70, at least for detecting an angular position of the two brake components 2, 3 relative to one another. The detection is performed using a magnetic ring unit 71 and by means of a magnetic field sensor 72. Here, the sensor device 70 is connected to the second brake component 3 by means of a decoupling apparatus 78. The decoupling apparatus 78 magnetically decouples the sensor device. Here, the sensor device 70 further comprises a shielding apparatus 75 which here comprises a plurality of shielding bodies 76 and which surrounds the magnetic ring unit 71 on three sides. A separating unit 77 is present between the magnetic ring unit and the shielding apparatus 75. The separating unit 77 additionally shields the magnetic ring unit 71. As a result, the volume defined by the magnetic ring unit 71 is largely shielded from magnetic influences of the electrical coil 26 or other magnetic fields.

Figure 4:
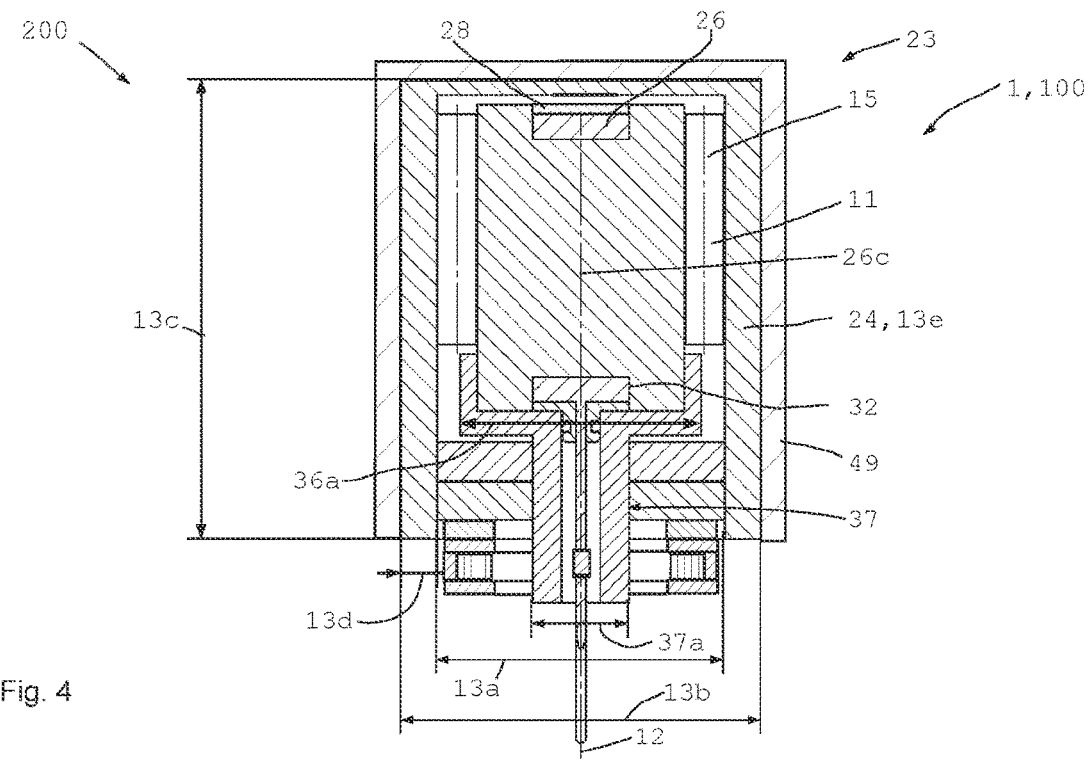
FIG. 4 shows a cross section through a further device component according to the invention having a magnetorheological braking apparatus.

FIG. 4 shows another device component 200 having a similar magnetorheological braking apparatus device 1 in section. Said figure shows the transverse grooves 32 in which the electrical coil 26 is wound at the axial ends of the core 21. A potting compound 28 is provided at both ends in the axial direction for closure purposes. A separate seal is provided by means of, for example, the illustrated O-ring or the like in the region of the cable bushing 35.

It is also possible for some of the roller bodies 11 arranged distributed over a portion of the periphery to be designed as magnetically non-permeable transmission components 11. All roller bodies 11 are preferably composed of a magnetically permeable material such as, for example, steel.

A length or height 13c of the rotary part 13 and of the sleeve part 13e or of the second brake component 3 in the axial direction 20 is preferably between 5 mm and 90 mm. A covering 49 can be applied to the outside of the second brake component 3, so that the external appearance of the rotary knob 23 is substantially determined by the surface of the covering 49. The rotary part 13 has an outside diameter 13b and an inside diameter 13a.

The material of the sleeve part 13e or outer ring 24 or of the rotary part 13 overall is magnetically permeable and serves to close the magnetic circuit. A wall thickness 13d of the sleeve part 13e is preferably at least half the size of a diameter of the roller bodies 11.

The outside diameter 36a of the receptacle 36 is preferably significantly larger than the diameter 37a of the cylindrical running surface 37. As a result, the friction on the seal 38 is reduced. In addition, standardized bearings 30 can be used.

It is also possible for the core 21 and also the holder 4 to be embodied in two parts. The separation preferably runs along the central line indicated in FIG. 4, this resulting in a left-hand-side and a right-hand-side (core) half. The two core halves can be spaced apart from one another by a magnetically non-permeable element (for example a seal). The potting compound volume 28 in this instance is preferably part of the core half (halves), this resulting in a semicircular element having an encircling groove on the separating surface for the electrical coil 26. Further preferably, the receptacle 36 is also separated into two halves. One receptacle half may also form one part (be embodied in one piece) with one core half, or one core half may be embodied in one piece with a complete receptacle unit 36.

Here, the haptic operator control device 100 having the magnetorheological braking apparatus 1 is mounted on one side. Here, the second brake component 3 is held only at the first end of the closed chamber 110 at an end portion 121 of the first brake component 2, that is to say the second brake component 3 is mounted by the bearing 30 only at the first bearing point 112. In the event of a change in the volume 114 within the closed chamber 110, the second brake component 3 can easily move back and forth. It is again assumed here that the first brake component 2 is stationary. In this case, part of the diameter 116 of the first brake component 2 moves in or out at the first bearing point 112. The volume 114 of the closed chamber 110 changes. The system is advantageously practically always at ambient pressure within the given range of movement. Additional loading of the seal 38 is prevented.

FIGS. 5a to 5d show various schematic cross sections through the magnetorheological braking apparatus 1, which can be used in device components 200 as per FIGS. 3 and 4 and also in other exemplary embodiments.

The inner brake component 2 is stationary and is surrounded by the continuously rotatable brake component 3. The second brake component 3 has a rotary part 13 which is rotatable about the first brake component 2 and is hollow and cylindrical on the inside. The encircling gap between the first and the second brake component 2, 3 can be clearly seen. Here, the gap 5 is at least partially, and in particular completely, filled with a magnetorheological medium 6.

The first brake component 2 has the core 21, which extends in the axial direction 20 and is composed of a magnetically permeable material, and an electrical coil 26 which is wound around the core 21 in the axial direction 20 and defines a coil plane 26c. The magnetic field 8 of the electrical coil 26 extends through the first brake component 2, or the core 21, transversely to the axial direction 20.

It can be clearly seen that a maximum outer diameter 26a of the electrical coil 26 in a radial direction 26d within the coil plane 26c is larger than a minimum outer diameter 21b of the core 21 in a radial direction 25 transverse, and for example perpendicular, to the coil plane 26c.

The roller bodies 11 are each arranged only in angular segments 61, 62 and cannot rotate completely about the core 21 since the electrical coil 26 protrudes into the gap 5 or duct 5 and thus prevents a complete revolution.

Figure 5A:
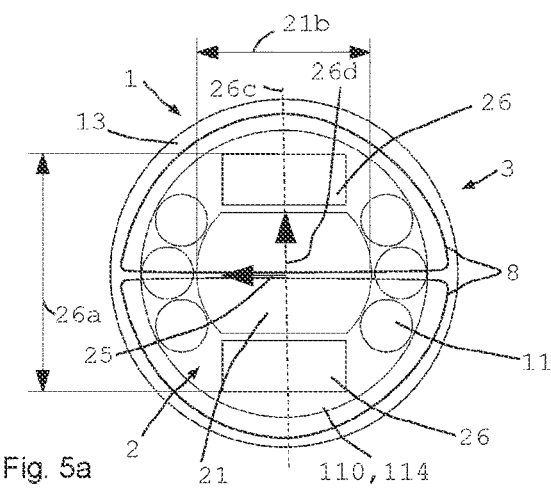
FIGS. 5a-5d show schematic cross sections through the device components according to the invention having a magnetorheological braking apparatus as per FIG. 3 or 4.

As a result, there is less available space for the roller bodies 11. However, this leads to an even higher concentration of the magnetic field 8. Three magnetic field lines are illustrated in FIG. 5a by way of example.

Figure 5B:
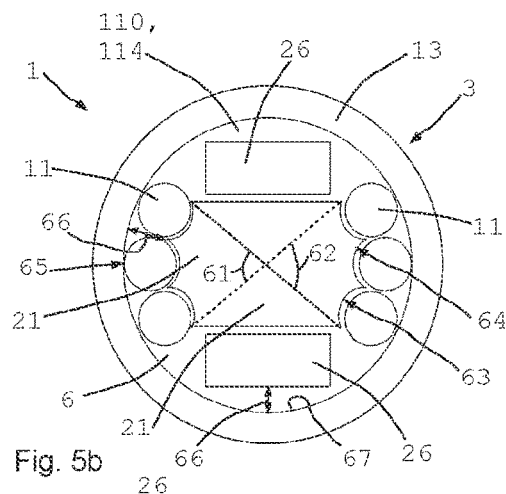

In FIG. 5b, the roller bodies 11 are not held on a cylindrical outer surface of the core 21, but rather at receptacles 63 which are specially adapted to the contour of the roller bodies 11 and on which the roller bodies 11 are held and guided, preferably with a certain amount of play. The transition of the magnetic field 8 into the roller bodies 11 is advantageous since a large amount of transmission surface area is available between the core 21 or the outer surface 64 at the receptacles 63 and the roller bodies 11. There is a gap 5 with a variable gap height between the inner surface 67 of the rotary part 13 and the core 21.

The electrical coil 26 is arranged outside the angular segments 61 and 62. There are no roller bodies 11 outside the angular segments 61 and 62.

Figure 5C:
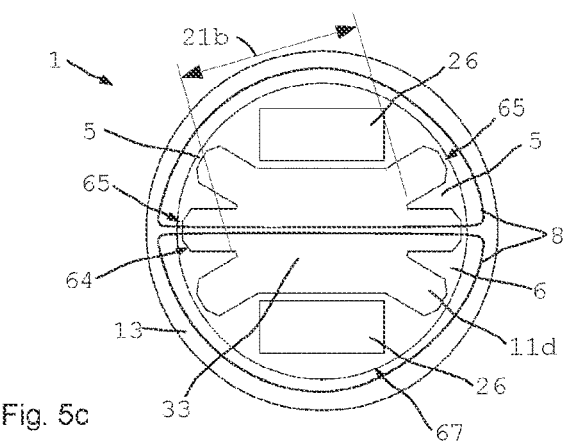
Figure 5D:
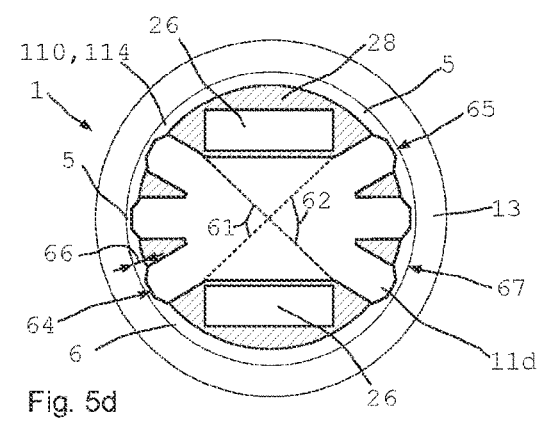

FIGS. 5c and 5d show further developments in which roller bodies 11 are completely dispensed with. The cores 21 have outwardly projecting transmission components 11 which extend radially outward from the main body 33. In FIG. 5c, the chamber 110 between the core 21 and the rotary part 13 is completely filled with MRF.

The maximum outer diameter 26a of the coil 26 is larger than the minimum core diameter 21b. The radial extent of the gap 5 varies over the periphery. There is only a small radial gap dimension 65 at the outer ends of the transmission components 11, while a radial distance 66 between the brake component 2 and the brake component 3 at other points is significantly greater.

FIG. 5d shows a variant of FIG. 5c in which the chamber 110 is filled with potting compound 28 by way of a cylindrical portion in order to reduce the MRF volume 114. As a result, the required volume 114 of MRF drops. The radial distance 66 is significantly decreased, but remains significantly greater (at least by a factor of 2 or 3 or 5 or 10) than the radial gap dimension 65. This ensures that the wedge effect described occurs. The MRF particles 19 interlink in the acute-angled regions 10 and form a type of wedge, which leads to a significant braking moment. In FIGS. 5c and 5d, the transmission components 11 form kinds of radial arms 11d.

FIGS. 6a to 6d show a further embodiment of a device component 200 which here again has a magnetorheological braking apparatus 1 and comprises brake components 2 and 3. A "horizontal or axial coil" 26 is again used, in the case of which the electrical coil 26 is wound around the core 21 in the axial direction 20 and again has a maximum radial coil diameter 26a which is larger than a minimum core diameter 21b of the core 21. The roller bodies or transmission elements 11 are not arranged over the entire periphery here either. The device component 200 can furthermore serve as a pushbutton 74.

Here, the device component 200 is embodied as a haptic operator control device 100 and specifically as an operator control knob 101. The second brake component 3 is held at the bearing point 112 at the first end of the closed chamber 110. In addition, the second brake component 3 is held on the first brake component 2 at the second bearing point 118. Here, the bearing 30 is implemented by means of an axle stub 119 with a diameter 117 at the second bearing point 118. The sealing ring 46 prevents the magnetorheological medium 6 from flowing into the region behind the axle stub 119.

Here, the diameter 117 at the second bearing point 118 is embodied to be considerably smaller than the diameter 116 at the first bearing point 112. In this way, a change in volume in the event of an axial displacement is also rendered possible here. Temperature-related changes in volume and changes in volume due to leakages can be compensated for.

To this end, a relative axial displacement of the first brake component 2 with respect to the second brake component 3 takes place.

In addition, there is also a sensor device 70 for detecting an angular position of the haptic operator control device 100 here. The magnetic field sensor 72 is integrated in the stationary receptacle 4 or the first brake component 2. The cable 45 of the magnetic field sensor 72, that is to say the sensor line 73, is guided to the outside through the cable bushing 35 at the receptacle 36.

The first axle part or the holder 4 of the brake component 2, as is illustrated in FIGS. 6b and 6c, can preferably be embodied in two parts. As a result, fitting the electrical lines and in particular the sensor line 73 within the first brake component 2 is simplified above all. The cables can be installed through the open cable bushing 35.

The sensor device 70 is once again illustrated in detail in FIG. 6d. The first brake component 2 and the second brake component 3, which is embodied as the rotary part 13 here, are merely indicated (dashed lines). The sensor device 70 is supported on the rotatable second brake component 3 in a magnetically decoupled manner by means of the decoupling device 78. Here, the shielding apparatus 75 is composed of three shielding bodies 76 which mitigate the straying of the magnetic field 8 of the electrical coil 26. Furthermore, a separating unit 77 for magnetic separation is further also present. The magnetic ring unit 71 is used for measuring the orientation or the rotation angle of the magnetorheological braking apparatus 1. The magnetic field sensor 72 is arranged within the first brake component 2. In addition, small relative axial displacements can be used in order to detect, for example, an operator control knob 101 being depressed, cf. FIG. 8.

Figure 7:
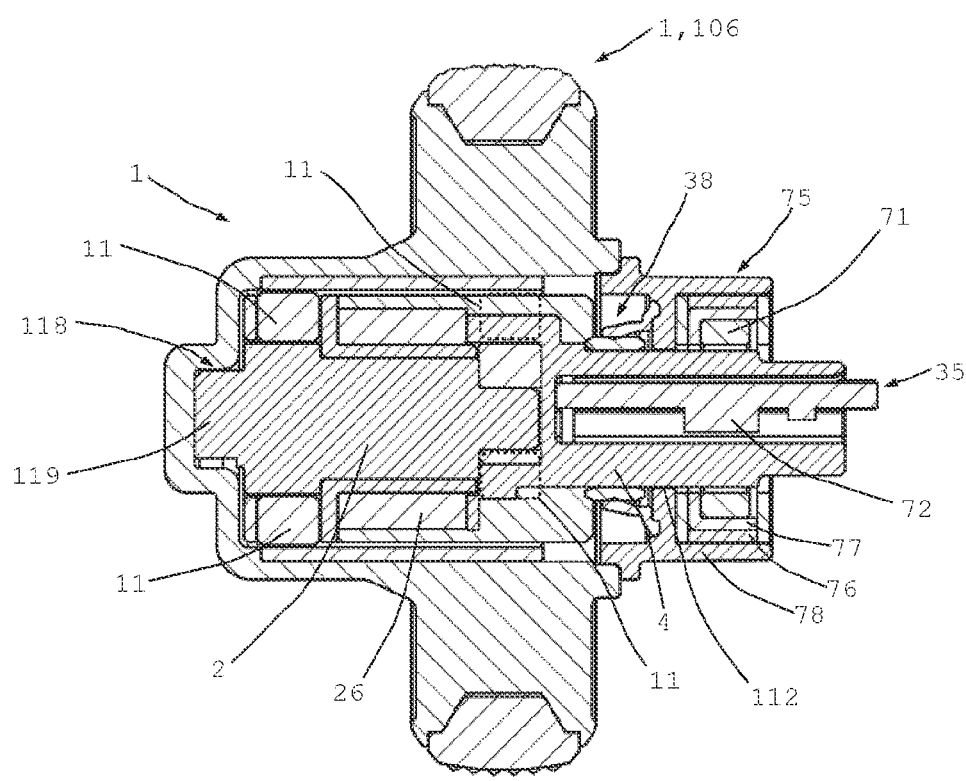
FIG. 7 shows yet another device component according to the invention having a magnetorheological braking apparatus in section.

In FIG. 7, the magnetorheological braking apparatus 1 is integrated into a mouse wheel 106. The first brake component 2 is again mounted within the second bearing point 118 by an axle stub 119 on the second side of the closed chamber 110. The diameter 116 at the first bearing point 112 is different from the diameter 117 at the second bearing point 118, so that changes in volume of the magnetorheological medium 6 can be automatically compensated for within the magnetorheological braking apparatus 1.

The sensor device 70 comprises, in addition to the magnetic field sensor 72, a magnetic ring unit 71 and a shielding apparatus 75 in order to minimize magnetic interference signals.

Figure 8:
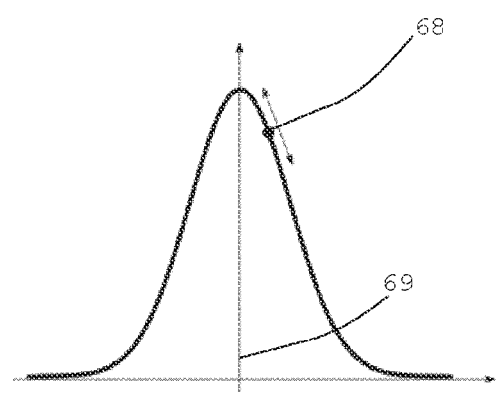
FIG. 8 shows a schematic illustration of a curve of a sensor signal.

The received signal 68 according to the illustration of FIG. 8 varies owing to an axial displacement. FIG. 8 shows the curve of the amplitude 69 of the signal 68 detected by the magnetic field sensor 72 as a function of the axial displacement of the brake components 2, 3 (horizontal axis). The amplitude 69 of the detected signal 68 changes owing to an axial displacement of the magnetic field sensor 72 with respect to the magnetic ring unit 71. An axial displacement or depressing an operator control knob 101 or a lateral displacement for example of a mouse wheel 106 or other components can be detected. The rotation angle can also be detected using the same sensor, wherein the direction of the magnetic field 8 is ascertained in order to detect the rotation angle. The intensity determines the axial position. Therefore, a conclusion about operation of the pushbutton 74, cf. FIG. 7, can be drawn from a change in the signal 68. This is advantageous since a single (multi-dimensional) Hall sensor can be used for determining the angular position and determining an axial position.

Figure 9A:
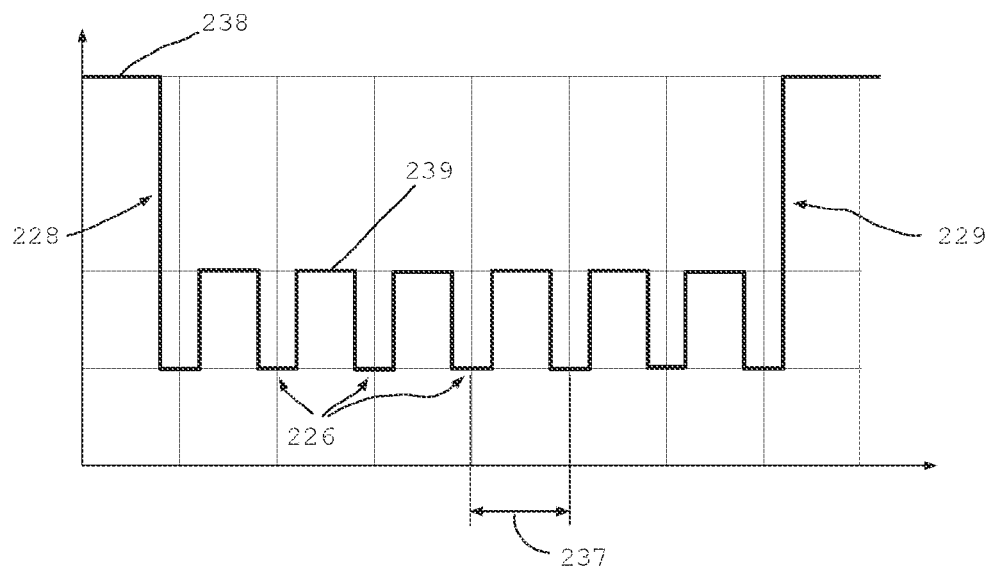
FIGS. 9a-9c show possible torque curves in relation to the angle of rotation of a magnetorheological braking apparatus of a device component according to the invention.
Figure 9B:
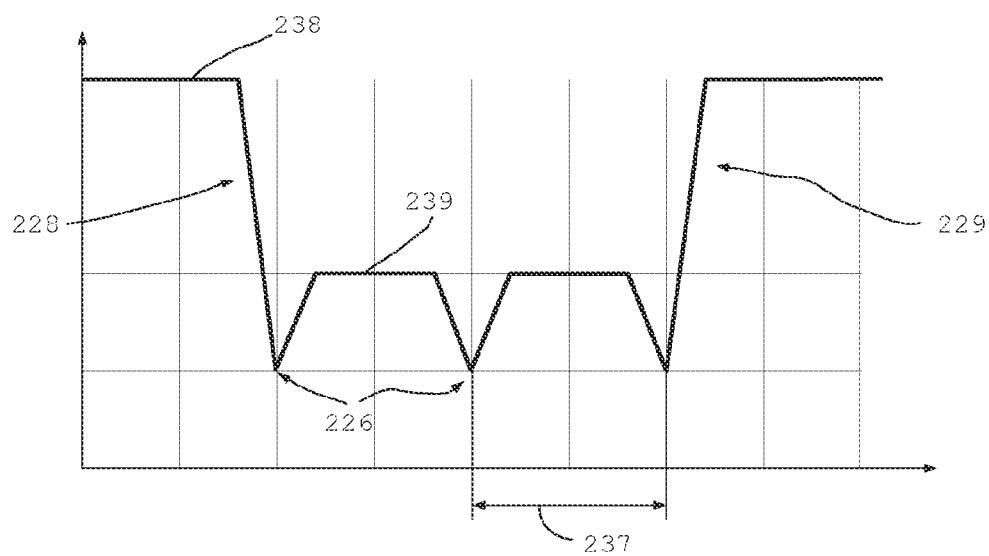
Figure 9C:
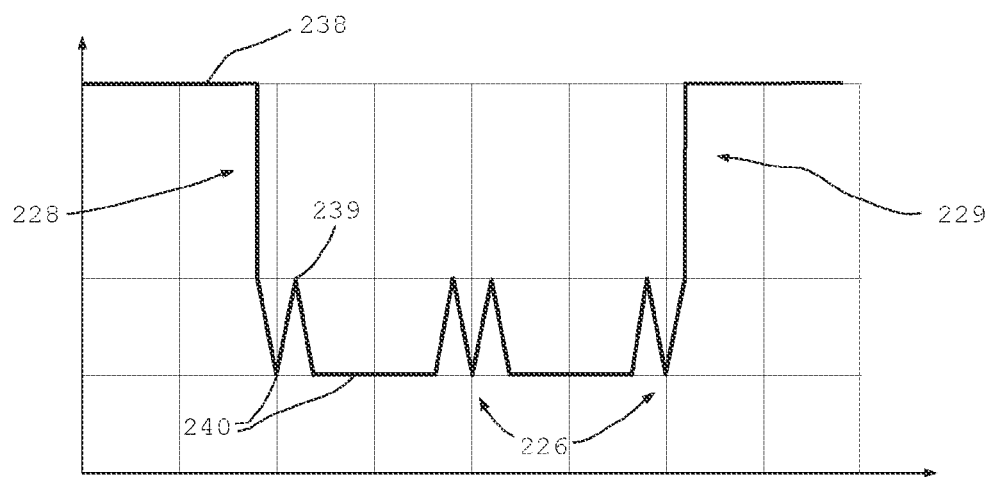

Possible design variants for controlling a dynamically generated magnetic field or a dynamically generated braking moment as a function of the rotation angle are illustrated in FIGS. 9a, 9b and 9c.

FIG. 9a here shows a variant in which the device component 200 is used as a rotary knob and a haptic operator control aid. The rotational resistance in relation to the rotation angle is illustrated. A left-hand-side end stop 228 and a right-hand-side end stop 229 can be generated using the controller 27. As the rotary knob 23 is rotated further, a strong magnetic field or stop moment 238 is generated there, as a result of which the rotary knob 23 faces high resistance to a rotational movement. The user receives the haptic feedback of an end stop 228, 229.

Here, a rastering of the rotational movement may be implemented or generated. For example, this may be used to navigate through a graphical menu and to select menu items. Here, a first raster point 226, which during operator control corresponds for example to a first menu item, is provided directly next to the left-hand-side end stop 228. If the intention is to select the next menu item, the rotary knob 100 has to be rotated clockwise. For this purpose, the dynamically generated higher magnetic field or detent moment 239 or the frictional moment thereof has to be overcome before the next raster point 226 is reached. In FIG. 11a, an in each case constant magnetic field 8 is generated for a certain angular range in each case at the raster points 226 and at the regions situated in between, which magnetic field is considerably lower at the raster points 226 than in the regions situated in between, and is once again considerably lower than at the stops 228, 229.

An angular interval 237 between individual raster points is dynamically variable and is adapted to the number of available raster points 226 or menu items. In this case, the operator control apparatus 100 has the base moment 240.

FIG. 9b shows a variant in which, toward the end stops 228, 229, the magnetic field does not increase abruptly but rather follows a steep course. Furthermore, at the raster points 226, ramp-like gradients of the magnetic field 8 are provided in each case to both rotational sides, as a result of which the rotational resistance increases in the corresponding directions of rotation. Here, with the same operator control device 100, only three raster points 226 are provided, the angular interval 237 of which is greater than in the example as per FIG. 11a.

FIG. 9c shows a variant in which there is a relatively low rotational resistance between individual raster points 226 and an increased magnetic field 239 is generated in each case only directly adjacent to the raster points 226, in order to allow latching at the individual raster points 226 and at the same time provide only a low rotational resistance between individual raster points 226.

Mixing of the operating modes and of the magnetic field curves of FIGS. 9a, 9b and 9c is also possible in principle. For example, in different submenus, a correspondingly different setting of the magnetic field curve may be implemented.

It is also possible in all cases that, for example in the case of a ripple (raster), switching is no longer performed, as before, between low and high current intensity with the same polarity (that is to say for example +0.2 to +0.8 A=ripple), but rather alternately with changed polarity, that is to say from +0.2 to +0.8 A and then the next ripple with −0.2 A to −0.8 A and then the next moment peak from +0.2 to +0.8 A etc.

The preferably low-alloy steel may comprise a residual magnetic field. The steel is preferably demagnetized at regular intervals or when required (inter alia by way of a special alternating field).

The material FeSi3P (silicon steel) or a related material is preferably used for the components through which the magnetic field 8 flows.

In all cases, speech- or sound-based control may be implemented. With speech control, the braking apparatus can be controlled adaptively.

When the rotary unit is not being rotated, that is to say the angle is constant, the electrical current is preferably decreased continuously over time. The electrical current may also be varied in a speed-dependent manner (angular speed of the rotary unit).

LIST OF REFERENCE SIGNS

1 Magnetorheological braking apparatus
2 First brake component
3 Second brake component
4 Holder
5 Gap, duct
5a Gap width
6 Medium
8 Field, magnetic field
9 Clear distance
10 Acute-angled region
11 Transmission component, roller body, rotary body
11d Arm
12 Rotation axis
13 Rotary part
13a Inside diameter
13b Outside diameter
13c Height
13d Wall thickness
13e Sleeve part
14 Ball
15 Cylinder
16 Wedge shape
17 Direction of the relative movement
18 Direction of the relative movement
19 Magnetic particles
20 Axial direction
21 Core
21b Minimum diameter
23 Rotary knob
24 Outer ring
25 Radial direction
26 Coil, electrical coil
26a Maximum outer diameter
26c Coil plane
26d Radial direction to 26c
27 Control device
28 Potting compound
30 Bearing
32 Transverse groove
33 Main body
35 Cable bushing
36 Receptacle
36a Outside diameter
37 Cylindrical running surface
37a Outside diameter
38 Seal
43 User interface
45 Cable
46 Sealing ring 49 Covering
50 Bracket
61 Angular segment
62 Angular segment
63 Receptacle for 11
64 Outer surface
65 Radial gap dimension
66 Radial distance
67 Inner surface of 13
68 Signal
69 Amplitude
70 Sensor device
71 Magnetic ring unit
72 Magnetic field sensor
73 Sensor line
74 Pushbutton
75 Shielding apparatus
76 Shielding body
77 Separating unit
78 Decoupling apparatus
100 Haptic operator control device
101 Operator control knob
102 Thumb wheel
103 Computer mouse
104 Joystick
105 Gamepad
106 Mouse wheel
110 Closed chamber
111 First end of 110
112 First bearing point
113 Magnetic field-generating device
114 Volume of 110
115 Second end of the closed chamber
116 Diameter of the first bearing point
117 Diameter of the second bearing point
118 Second bearing point
119 Axle stub
120 Compensation duct
121 End portion of 2
122 Radial direction (global)
200 Device component
226 Raster point
228 End stop
229 End stop
237 Angular interval
238 Stop moment
239 Raster moment
240 Base moment

The invention claimed is:

1. A device component, comprising:
a stationary holder and at least two brake components including a first brake component and a second brake component;
one of said first and second brake component being rotationally fixed to said holder and extending in an axial direction;
said second brake component having a hollow sleeve part and surrounding said first brake component;
said first and second brake components being rotatably mounted relative to one another and forming a closed chamber therebetween;
a magnetorheological medium substantially filling said closed chamber;
said second brake component being rotatably held on said first brake component at a first end of said closed chamber, and said second brake component being axially displaceable on said first brake component, to change a volume of said closed chamber by a relative axial displacement of said first and second brake components in order to compensate for temperature-related or leakage-related changes in volume of said magnetorheological medium; and
a magnetic field-generating apparatus for generating a magnetic field for influencing said magnetorheological medium in said closed chamber.

2. The device component according to claim 1, wherein said second brake component is displaceably held on said first brake component at a second end of said chamber, wherein a diameter of a first bearing point at the first end of said closed chamber is different from a diameter of a second bearing point at the second end of said closed chamber.

3. The device component according to claim 2, wherein the second diameter of the second bearing point is smaller than the first diameter of the first bearing point, and the volume of the closed chamber is increased by an axial displacement in a direction towards the second bearing point.

4. The device component according to claim 3, wherein a ratio of the diameter of the first bearing point to the diameter of the second bearing point has a value of between 1.1 and 4.

5. The device component according to claim 2, wherein the diameter of the second bearing point is larger than the diameter of the first bearing point, so that the volume of the closed chamber is increased by an axial displacement in a direction towards the first bearing point.

6. The device component according to claim 5, wherein a ratio of the diameter of the first bearing point to the diameter of the second bearing point has a value of between 0.25 and 0.9.

7. The device component according to claim 1, wherein said second brake component surrounds an end section of said first brake component in a pot shape and the second bearing point is formed as an axle stub.

8. The device component according to claim 1, wherein said first brake component is formed with at least one compensation duct connecting regions close to the first and second bearing points to one another.

9. The device component according to claim 1, wherein said first and second brake components are configured to allow a relative axial displacement of said first brake component with respect to said second brake component of at least 0.05 mm.

10. The device component according to claim 9, wherein said first and second brake components are configured to allow a relative axial displacement of said first brake component with respect to said second brake component of no more than 2 mm.

11. The device component according to claim 1, wherein the closed chamber has at least one encircling gap formed between said first and second brake components, and wherein the magnetic field of said magnetic field-generating apparatus is generated within the gap in order to influence the magnetorheological medium within said gap.

12. The device component according to claim 11, which further comprises a number of one, two, or more rotatable rotary bodies arranged in said gap, with said rotary bodies being roller bodies with a cross-section selected from the group consisting of cylindrical, spherical, round, and rounded.

13. The device component according to claim 12, wherein at least some of said rotary bodies are composed of a magnetically permeable material and/or wherein at least some of said rotary bodies are composed of a magnetically non-permeable material.

14. The device component according to claim 1, wherein said first brake component comprises a core which extends in an axial direction and is composed of a magnetically permeable material.

15. The device component according to claim 1, wherein at least one of said sleeve part or said second brake component is composed of a magnetically permeable material and forms an outer ring for the magnetic field.

16. The device component according to claim 1, wherein said first brake component is substantially cylindrical and comprises a cylindrical main body forming a core and an electrical coil of said magnetic field-generating apparatus.

17. The device component according to claim 1, wherein said holder has at least one cable bushing.

18. The device component according to claim 1, wherein said holder has a receptacle for a non-rotatable connection to said first brake component, and wherein said first brake component has a cylindrical running surface and said second brake component is held in a rotatable manner.

19. The device component according to claim 18, which comprises a seal arranged on said cylindrical running surface for sealing off said closed chamber.

20. The device component according to claim 1, wherein said magnetic field-generating apparatus comprises at least one electrical coil.

21. The device component according to claim 20, wherein said electrical coil is wound in a radial direction and the magnetic field extends in the axial direction of said first brake component.

22. The device component according to claim 20, wherein said electrical coil is wound in the axial direction and defines a coil plane, and wherein a magnetic field of said electrical coil extends transversely through said first brake component.

23. The device component according to claim 22, wherein a maximum diameter of said electrical coil in a radial direction within the coil plane is greater than a minimum diameter of said core in a radial direction transverse to the coil plane.

24. The device component according to claim 1, further comprising a sensor apparatus with at least one magnetic ring unit and at least one magnetic field sensor connected in a rotationally fixed manner to said first brake component and arranged radially and/or axially adjacent said magnetic ring unit, for detecting a magnetic field of said magnetic ring unit.

25. The device component according to claim 24, wherein said magnetic ring unit is fastened to said hollow sleeve part.

26. The device component according to claim 24, comprising a shielding apparatus for at least partially shielding said sensor apparatus from a magnetic field of an electrical coil of said magnetic field-generating apparatus.

27. The device component according to claim 26, wherein said shielding apparatus comprises at least one shielding body which surrounds the magnetic ring unit at least in sections, wherein said shielding apparatus comprises at least one of a separating unit arranged between said shielding body and said magnetic ring unit or a magnetic decoupling device arranged between said shielding body and said rotary part.

28. The device component according to claim 27, wherein said separating unit and said decoupling apparatus have a magnetic permeability that is a plurality of times lower than a magnetic permeability of said shielding body.

29. The device component according to claim 27, wherein said shielding apparatus comprises at least one axial annular disk and at least one annular sleeve.

30. The device component according to claim 27, wherein said shielding apparatus and said magnetic ring unit are arranged at a spacing distance from one another.

31. The device component according to claim 1, further comprising a user interface, an operator control panel, a display, a touch-sensitive display with or without haptic feedback, and/or at least one sensor.

32. The device component according to claim 1, wherein at least one component through which the magnetic field flows is at least partially formed of $FeSi_3P$.

* * * * *